United States Patent
Repperger et al.

(10) Patent No.: US 8,326,088 B1
(45) Date of Patent: Dec. 4, 2012

(54) DYNAMIC IMAGE REGISTRATION

(75) Inventors: Daniel W. Repperger, Dayton, OH (US); Rodney G. Roberts, Tallahassee, FL (US); Alan R. Pinkus, Bellbrook, OH (US); Robert D. Sorkin, St. Augustine, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 794 days.

(21) Appl. No.: 12/471,543

(22) Filed: May 26, 2009

(51) Int. Cl.
*G06K 9/32* (2006.01)
(52) U.S. Cl. ........ 382/294; 345/418; 345/419; 345/501; 345/582; 348/46; 352/57; 382/103; 382/209; 600/407
(58) Field of Classification Search .................. None
See application file for complete search history.

(56) References Cited

U.S. PATENT DOCUMENTS

| | | | | |
|---|---|---|---|---|
| 4,925,294 A * | 5/1990 | Geshwind et al. | | 352/57 |
| 5,384,912 A * | 1/1995 | Ogrinc et al. | | 345/501 |
| 6,356,272 B1 * | 3/2002 | Matsumoto et al. | | 345/582 |
| 6,466,205 B2 * | 10/2002 | Simpson et al. | | 345/419 |
| 6,744,441 B2 * | 6/2004 | Wu et al. | | 345/582 |
| 6,847,371 B2 * | 1/2005 | Matsumoto et al. | | 345/582 |
| 6,954,212 B2 * | 10/2005 | Lyons et al. | | 345/582 |
| 7,298,907 B2 * | 11/2007 | Hasegawa | | 382/209 |
| 2001/0005204 A1 * | 6/2001 | Matsumoto et al. | | 345/418 |
| 2005/0215879 A1 * | 9/2005 | Chuanggui | | 600/407 |
| 2006/0061583 A1 * | 3/2006 | Spooner et al. | | 345/582 |
| 2008/0069399 A1 * | 3/2008 | Nagao et al. | | 382/103 |
| 2008/0246836 A1 * | 10/2008 | Lowe et al. | | 348/46 |
| 2008/0259073 A1 * | 10/2008 | Lowe et al. | | 345/419 |

* cited by examiner

*Primary Examiner* — Tsung-Yin Tsai
(74) *Attorney, Agent, or Firm* — AFMCLO/JAZ; Fredric L. Sinder (57) ABSTRACT

A method for registering and fusing time-varying image sources to provide highest possible information rendering to an operator comprising the steps of aligning a plurality of image sources by matching target image to a reference image and minimizing visual registration error in a static sense and selecting target images which are best fused with a reference image using a dynamic, time-varying optimality maximum likelihood decision theory. The maximum likelihood decision theory is modified to account for time-varying using an orthogonal projection technique charactering changing density functions.

12 Claims, 10 Drawing Sheets

| Diff$_1$ | Diff$_2$ | Diff$_3$ | Diff$_4$ | Diff$_5$ |
|---|---|---|---|---|
|  |  |  |  |  |
| Diff$_6$ | Diff$_7$ | Diff$_8$ | Diff$_9$ | Diff$_{10}$ |
|  |  |  |  |  |
| Diff$_{11}$ | Diff$_{12}$ | Diff$_{13}$ | Diff$_{14}$ | Diff$_{15}$ |
|  |  |  |  |  |
| Diff$_{16}$ | Diff$_{17}$ | Diff$_{18}$ | Diff$_{19}$ | Diff$_{20}$ |
|  |  |  |  |  |
| Diff$_{21}$ | Diff$_{22}$ | Diff$_{23}$ | Diff$_{24}$ | Diff$_{25}$ |
|  |  |  |  |  |
| Diff$_{26}$ | Diff$_{27}$ | Diff$_{28}$ | Diff$_{29}$ | Diff$_{30}$ |
|  |  |  |  |  |
| Diff$_{31}$ | Diff$_{32}$ | Diff$_{33}$ | Diff$_{34}$ | Diff$_{35}$ |
|  |  |  |  |  |

DYNAMIC IMAGE REGISTRATION

RIGHTS OF THE GOVERNMENT

The invention described herein may be manufactured and used by or for the Government of the United States for all governmental purposes without the payment of any royalty.

BACKGROUND OF THE INVENTION

The invention relates to image registration and more particularly to dynamic image registration based on optimal estimation and maximum likelihood methods.

As background, signal detection theory will first be considered as it is later shown to pertain to the image fusion, registration problem when relative motion exists between the object of interest and the different image capturing apparatus, FIG. 7 portrays the classical problem of signal detection theory. The signal to be identified in the top plot 700 is zero in the low state but may go into a high state for some interval of time 703. The noise in the second plot 701 is zero mean with constant variance. In the bottom plot 702, the sum of the top two prior figures is rendered. The goal is to measure the bottom plot (signal+noise) and to discern when the signal may be in the high state.

Figure 6:
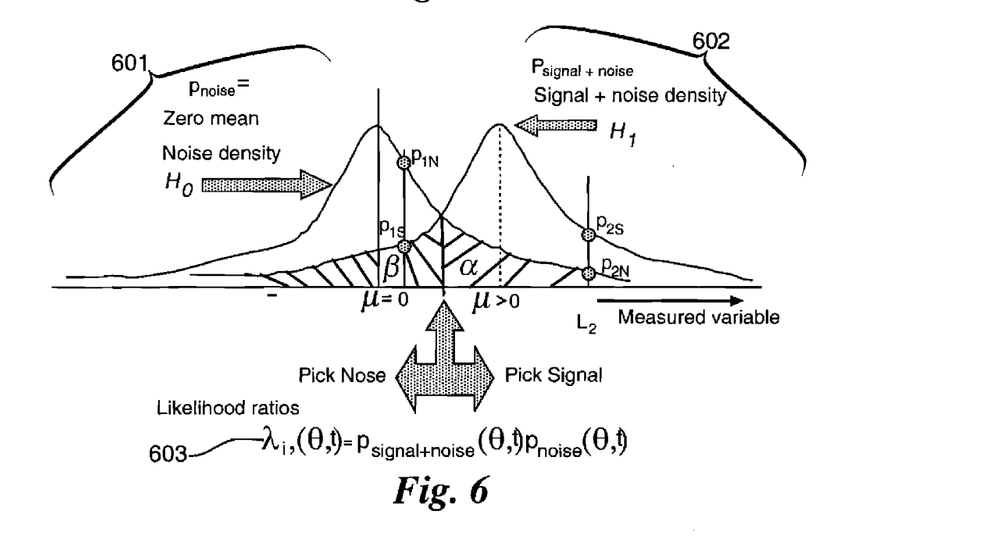
FIG. 6 illustrates the likelihood ratio according to the arrangement of the invention.
Figure 8:
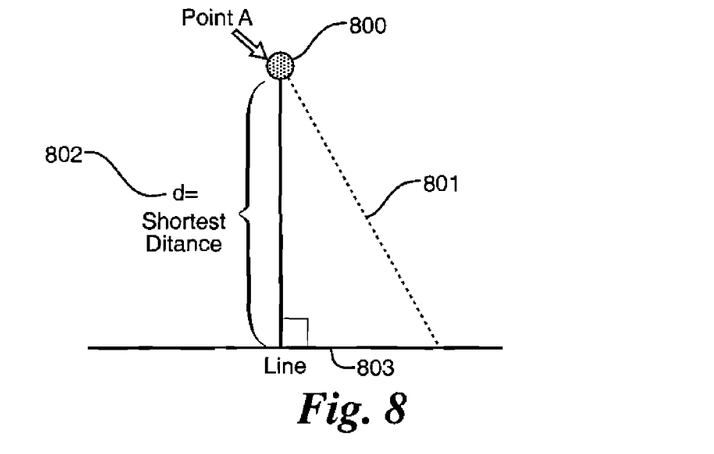
FIG. 8 illustrates the principal of optimal estimation.

Referring to FIG. 6, the zero mean noise is the probability density plot to the left 601. The signal+noise density is the plot translated to the right 602. The likelihood ratio is obtained by drawing a vertical line and taking the ratio of the value of the signal+noise density to the noise, alone density. If this ratio is greater than one, the choice would be made to select the signal being present ($H_1$ hypothesis) over the choice of noise alone ($H_0$ hypothesis). It can be shown that the maximum likelihood decision-making process involves several types of optimality, e.g. if $\alpha$ is fixed in FIG. 6, the minimum $\beta$ will result if a maximum likelihood ratio is utilized. In the study of optimal estimation theory, the terms "orthogonal projection" can be considered synonymous with the term "optimal estimation." This is illustrated in FIG. 8 where the shortest distance 802 from a point A 800 to a line 803 is given by the orthogonal projection (line of length d). This is the distance of the point to the orthogonal projection onto the line. The distance d 802 is a minimum and thus is optimal (in a least squares sense) as judged against any other line, such as the dashed line 801 for comparison. In optimal estimation theory, the error between the estimator and the data is denoted via d. The principal of orthogonal projection is very similar to FIG. 8. The procedure of synthesizing an estimator so that the error vector is minimal (analogous to the smallest distance d in FIG. 8) being least squares optimal (lowest error) and is a desired design procedure. FIG. 8 illustrates why this is so for the case of the Euclidean plane. In general, the orthogonal projection method makes the estimation error (estimator−data) perpendicular to the data.

Figure 9:
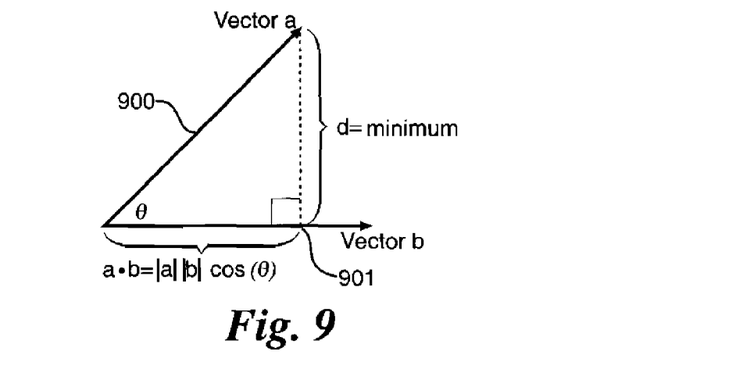
FIG. 9 illustrate the dot product of two vectors a and b.

To generalize the optimal estimation problem introduced, an inner product relationship with vectors, and matrices may be developed. The inner (dot) product of two vectors is defined for vectors a, 900, and b, 901, as follows:

$$<a,b>=a \cdot b=|a||b|\cos(\theta) \quad \text{Eq 1 (6)}$$

where $\theta$ is the angle between the two vectors a and b. This dot product concept is depicted in FIG. 9. The dot product can be viewed as the projection of one vector onto a given vector.

The inner product in FIG. 9 shows the optimal projection of the vector a, 900, onto another vector b. If the dot product (the projection onto) is zero with the length of one point, we say that the vector a is orthogonal to the vector b. If this is true, then we have the optimal projection (shortest error distance), thus the optimal solution. This can be generalized to matrices. Let $A_1$ and $A_2$ be two matrices. The inner product definition for vectors can now be generalized to matrices as follows:

$$<A_1,A_2>=A_1 \cdot A_2 = \text{trace}(A_1^T A_2) = \text{trace}(A_1 A_2^T) \quad \text{Eq 2}$$

where trace is the sum of the diagonal elements and the superscript $^T$ indicates matrix transpose. Since for two vectors a and b which are orthogonal, their dot product is zero:

$$<a,b>=a \cdot b=0 \quad \text{Eq 3}$$

To extend this to matrices, define $A_1$ as being orthogonal to $A_2$ if and only if:

$$<A_1,A_2>=A_1 \cdot A_2=0 \quad \text{Eq 4}$$

Thus in this application, the goal of the optimal estimation problem is to minimize an estimation error defined by the dot product of two matrices as follows:

$$\text{Minimize } e(t)=\text{estimation error}=<A_1,A_2>=A_1 \cdot A_2 \quad \text{Eq 5}$$

Applying this to the present invention, the matrix $A_1$ will be a difference matrix and may act like a noise source. The matrix $A_2$ may be a signal+noise difference matrix. The dot product will examine any correlation between these possible matrices. These points are discussed in the next section.

It is important to introduce two possible measures to evaluate the efficacy of the algorithms and techniques developed in this patent application in terms of their relative measure of the orthogonal projection of matrices. Denoting the Frobenious norm of a matrix A (A is of size n rows by m columns) as follows:

$$\|A\|_F^2 = \sum_{i,j}^{n,m} (a_{ij})^2 \quad \text{Eq 6}$$

The first measure is related to the cosine of the angle between the two matrices $A_1$ and $A_2$:

$$\text{Measure\_1} = \text{Cosine (Angle between } A_1 \text{ and } A_2) = \frac{\text{trace}(A_1^T A_2)}{\|A_1\|_F \|A_2\|_F} \quad \text{Eq 7}$$

From the equation above it is shown that $0 \leq \text{Measure\_}1 \leq 1$ and Measure_1 acts like a cosine of an angle between the two matrices $A_1$ and $A_2$. If Measure_1=0, then the matrices $A_1$ and $A_2$ are orthogonal. Their dot product would then be zero and this would result in an optimal design. A second measure is also useful for determining the degree of orthogonally between matrices.

$$\text{Measure\_2} = \frac{\text{trace}(A_1^T A_2)}{\frac{1}{2}(\|A_1\|_F \|A_2\|_F)} \quad \text{Eq 8}$$

Again, it can be shown that $0 \leq \text{Measure\_}2 < 1$ and if Measure_2$\approx$0, then the matrices $A_1$ and $A_2$ are orthogonal. Appendix B describes these points in further detail.

The application of this theory is now presented as it pertains to the image fusion, registration problem when relative motion exists between the object of interest and the different image capturing apparatus, according to the arrangement of the present invention.

SUMMARY OF THE INVENTION

A method for registering and fusing time-varying image sources to provide highest possible information rendering to an operator comprising the steps of aligning a plurality of image sources by matching target image to a reference image and minimizing visual registration error in a static sense and selecting target images which are best fused with a reference image using a dynamic, time-varying optimality maximum likelihood decision theory. The maximum likelihood decision theory is modified to account for time-varying using an orthogonal projection technique charactering changing density functions.

It is therefore an object of the present invention to provide a method for registering and fusing time-varying image sources to provide the highest possible information rendering to an operator.

It is another object of the invention to provide a method for registering and fusing time-varying image sources by first aligning a plurality of image sources and then selecting target images which are best fused with a reference image.

It is another object of the invention to provide a method for registering and fusing time-varying image sources by first aligning a plurality of image sources by matching a target image to a reference image and minimizing visual registration error in a static sense.

It is another object of the invention to provide a method for registering and fusing time-varying image sources by first aligning a plurality of image sources and selecting target images which are best fused with a reference image using a dynamic, time-varying optimality maximum likelihood decision theory.

It is another object of the invention to provide a method for registering and fusing time-varying image sources by first aligning a plurality of image sources and selecting target images which are best fused with a reference image using a dynamic, time-varying optimality maximum likelihood decision theory modified to account for time-varying using an orthogonal projection technique charactering changing density functions.

DETAILED DESCRIPTION

This patent application addresses the dynamic (time varying) aspects of how to best fuse information from multiple image sources during motion. This is a considerably more difficult problem than the static case of registering and fusing images because the received information may vary in quality over time. The dynamic problem presented herein is a natural extension of the static situation and involves many more issues. The technique introduced in this patent application has a number of new features and advantages. It employs two methods of optimality for the static registration and the dynamic fusion of image information. The initial calibration and registration of the multiple image sources are calibrated in an optimal sense that produces the lowest position error with a least squares measure using a method called singular value decomposition. A second optimality procedure (statistical based on maximum likelihood values) is implemented to employ only those target images that add value in a sense to improve identification of objects in images. Elimination of those target images that only add correlation or bias is accomplished and this method "data mines" out those target images which add little new information to the data already gleaned out from the prior analysis.

A significant aspect of the present invention is to generalize to the time varying case when the images or camera are now in motion. The way the dynamics change with time is manifested in the process such that the likelihood ratios change, accordingly, and this influences the decision-making in an appropriate way which is still optimal in a statistical sense.

Figure 1:
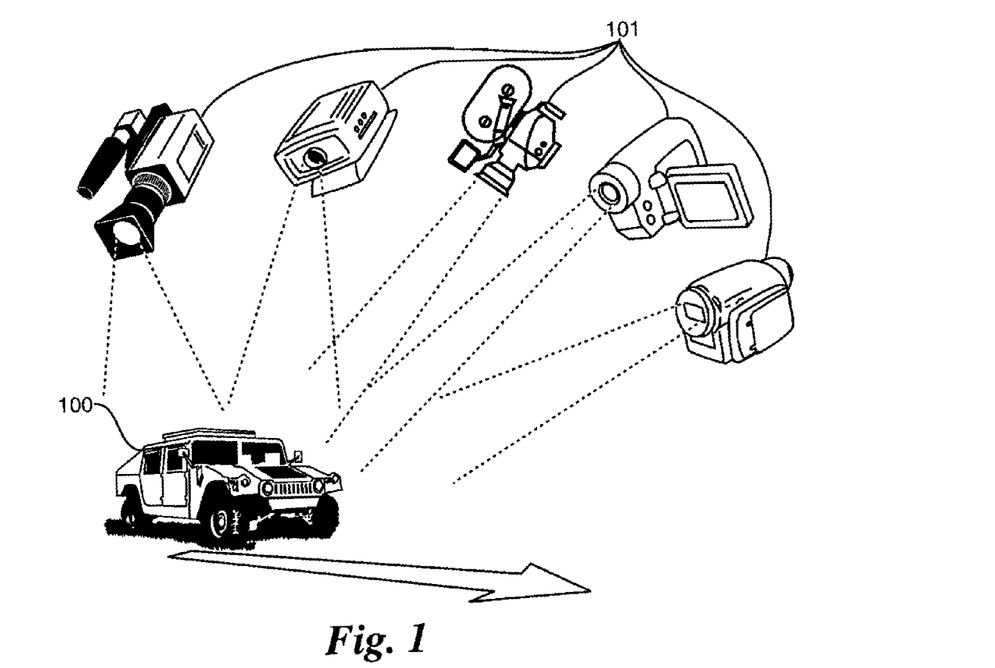
FIG. 1 shows stationary multi cameras and a moving object.
Figure 2:
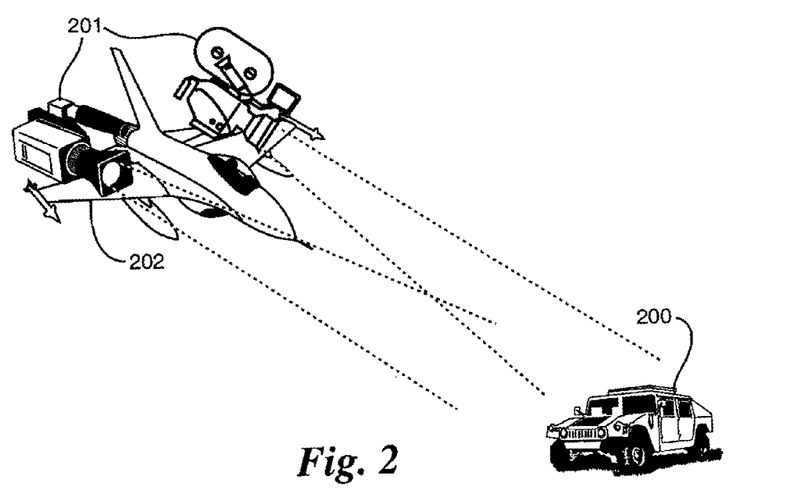
FIG. 2 shows moving multi cameras and a stationary object.
Figure 3:
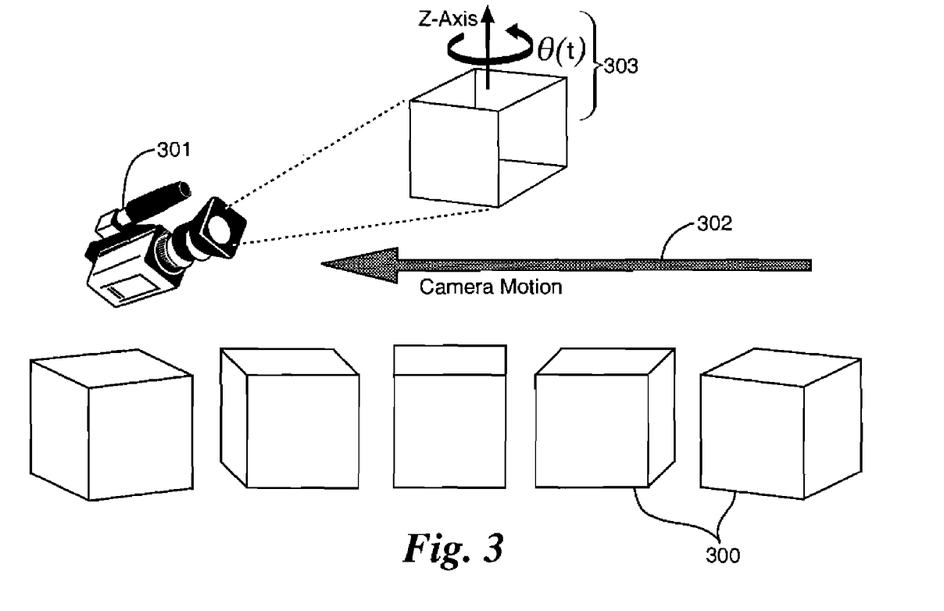
FIG. 3 shows a cubed object viewed by a moving camera.
Figure 4:
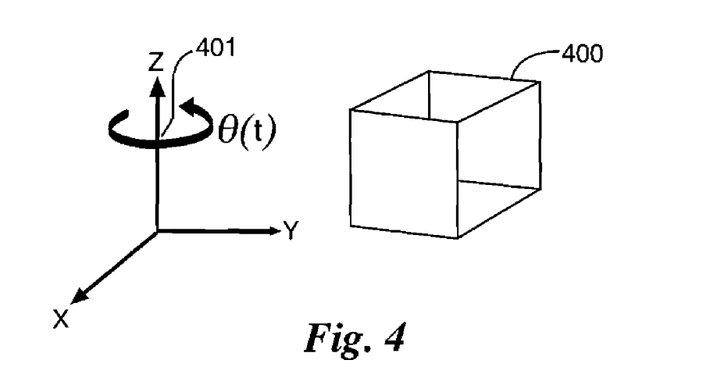
FIG. 4 shows rotation about Z-axis according to an arrangement of the invention.

For the dynamic problem, use will be made of a principle from optimal estimation theory termed "orthogonal projection" which is well known in the literature as the optimal least squares solution, even when systems are varying in real time. A brief conceptualization of the problem to be addressed is first presented in FIGS. 1 and 2. In FIG. 1, the camera sources 101 are stationary and the object of interest 101 is moving. However, in FIG. 2, the camera sources 201 may be in motion which changes in time with respect to a stationary object 200 of interest. The quality of information received in either case is predicated on the images gathered from the multispectral sources, or possibly from multi frames at different time samples involving one camera source. In the present invention, the particular way the images change with time will be exploited. The dynamic way the images are modeled is converted into a class of linear (affine) time-varying transformations. These transformations are then encapsulated into probability density functions that may vary with time using procedures from optimal estimation theory. To summarize, a preferred arrangement introduced here has four important steps. The first step of a preferred arrangement of the invention is to model the dynamic image process as the data are captured. FIG. 3 portrays a visual rendering of a "cube" test object 300 when viewed from different perspectives as a single camera source 301 is moved 302 (in a translational or rotational sense 303) relative to the object of interest. This can be approximated and modeled by a θ(t) rotation of the object variable about a Z axis as depicted in FIGS. 3 and 4. FIG. 4 shows rotation about the z-axis 401 of a "cube" test object 400. The image received at the camera obviously is adapted and the object's ability to be recognized may be vastly compromised depending on the relative angle between the camera source and the object in question.

The next step will be to capture the dynamics via an affine transformation $T[\theta(t)]$ which varies as a function of $\theta(t)$ as depicted in FIG. 3 and may depend on a translation term. Capturing the dynamics of how the images change in time is accomplished using a dynamic affine transformation mapping. By definition, an affine (linear) transformation is of the form:

(New Object)=$T[\theta(t)]$*(Old Object)+$B$   Eq 9 where $T[\theta(t)]$ is the rotation matrix and B would be the translation vector. (New Object) is the output image and (Old Object) is the input image. For the data in FIG. 3, it will be shown that the following affine transformation will map (Old Object) into (New Object) with a rotation about the Z axis as defined in FIGS. 3-4 with B=0.

$$\text{(New Object)} = \begin{bmatrix} \cos(\theta(t)) & -\sin(\theta(t)) & 0 \\ \sin(\theta(t)) & \cos(\theta(t)) & 0 \\ 0 & 0 & 1 \end{bmatrix} \text{(Old Object)} \quad \text{Eq 10}$$

In Eq 10 the $\theta(t)$ variable may vary with time as the camera moves relative to the object of motion.

The third step in a preferred arrangement of the invention is to convert the motion dynamics into a modeled time variation which helps improve the ability to correctly discern the object during relative motion. This is accomplished by capturing and mapping the motion dynamics from Eq 10 into a difference image matrix. This difference matrix will be computed and compared to reference images to see if each difference image adds any new information or just contains noise. From this analysis of the difference matrix calculation of a probability density function (pdf) and then a likelihood ratio determined depending on the ratios of the pdfs. Finally a decision-making algorithm will weigh the candidate images. Note: this process may change with time. As shown in the sequel, this will affect how much credence is employed to weight the data from this particular image capturing device.

Figure 5:
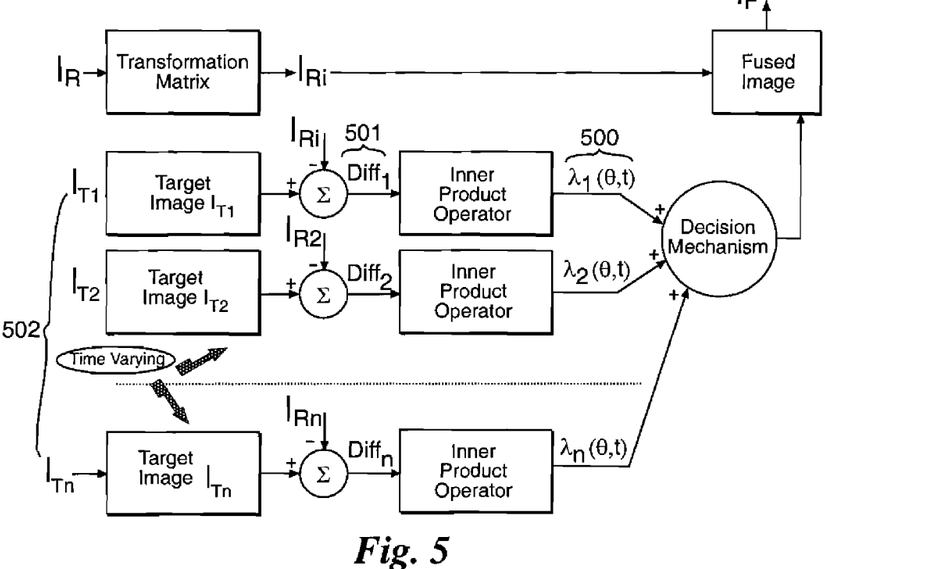
FIG. 5 shows a decision mechanism according to the arrangement of the invention.

The last step in the preferred arrangement of the invention is to use the information from step 2 to synthesize a fused image $I_F$ that will add some value to an observer concerning the correct identification of the object of interest. FIG. 5 shows how the $\lambda_i(\theta,t)$ terms are used for the fusion/registration problem in a dynamic sense. The relationship between the time varying likelihood ratios $\lambda_i(\theta,t)$, illustrated in FIG. 5 collectively at 500, and the various probabilities ($p_{noise}$ (no new information) and $p_{signal+noise}$ (new information with noise)) can be depicted in FIG. 6. The probabilities are based on the difference images 501 mentioned in FIG. 5. It is shown that $\lambda_i(\theta,t)$ at 500 in FIG. 5 and at 603 in FIG. 6 are the time-varying likelihood ratios and, with the $p_j(\theta,t)$ the constituent time varying probabilities, they make up the likelihood ratios for the two situations are as follows:

$$\lambda_i(\theta, t) = \frac{P_{signal+noise}(\theta, t)}{P_{noise}(\theta, t)} \quad \text{Eq 11}$$

The terms "signal+noise" and "noise" in Eq 11 are defined in terms of probability densities in FIG. 6 for the typical signal detection problem. These terms are related to the difference images Diff$_i$ 501 in FIG. 5. In signal detection theory, the goal is to measure a time series and to decide if this signal contains only random noise (hypothesis $H_0$ with no new information) or possibly contains a positive signal (hypothesis $H_1$ with a signal present representing new information appearing in the time series). However, two types of error can occur. Type 1=$\alpha$ which means $H_0$ is the ground truth but we erroneously select $H_1$, and Type 2=$\beta$ which means $H_1$ is the ground truth but we erroneously select $H_0$ as is portrayed in FIG. 6.

In FIG. 5, the role of the different $\lambda_i(\theta,t)$ (also defined in Eq 11 are to weigh the individual time varying difference image matrices Diff$_i$ through pdfs in a way that their relevance (in an information sense) can be captured in the fused image. The target images $I_{Ti}$, collectively at 502 in FIG. 5, may come from one camera at different instants of time (as shown in FIG. 3) or may result from different multispectral camera sources as depicted in FIGS. 1 and 2. For this motion case the $\lambda_i(\theta,t)$ may also vary in a time sense as denoted in FIGS. 5 and 6.

Implementation of the maximum likelihood method for this image application preferred arrangement of the invention will now be described. The first part is rotation about the z-axis as shown in FIGS. 3 and 4. Eq 10, which is a rotation about the z-axis, can be used to model rotation in a wide range of computer vision studies and robotics. Rotations may also occur around other axes as briefly discussed here for completeness.

The second part is rotation about the x and y axes. The results from the Z axis rotation generalize to the other axes. Let $\gamma(t)$ represent the angular rotation about the X axis and let $\eta(t)$ be the angular rotation about the Y axis, which can be represented dynamically via the following sets of affine transformations:

X-Axis Rotation:

$$\text{(New Object)} = \begin{bmatrix} 1 & 0 & 0 \\ 0 & \cos(\gamma(t)) & -\sin(\gamma(t)) \\ 0 & \sin(\gamma(t)) & \cos(\gamma(t)) \end{bmatrix} \text{(Old Object)} \quad \text{Eq 12}$$

Y-Axis Rotation:

$$\text{(New Object)} = \begin{bmatrix} \cos(\eta(t)) & 0 & -\sin(\eta(t)) \\ 0 & 1 & 0 \\ \sin(\eta(t)) & 0 & \cos(\eta(t)) \end{bmatrix} \text{(Old Object)} \quad \text{Eq 13}$$

More generally, from Eqs 10-13 the rotation about any axis has unity on the diagonal of that axis with the sin and cos terms in the patterns as displayed in Eqs 10-13

Since the method employed herein involves an affine transformation matrix $T[\theta(t)]$, it is not necessary to store a large number of reference images $I_R(t)$. Rather, the dynamic reference images $I_{Ri}(t)$ can be calculated via $I_{Ri}(t)=T[\theta_i(t)]\ I_R$, which saves considerable computation time and computer storage in the implementation.

The matrix description of orthogonal decomposition as applied to matrices is implemented in terms of the fusion and registration problem for dynamically moving environments. First a discussion is provided on the simple orthogonally principle for noise and signal plus noise for the scalar case. This technique is then generalized to matrices and to the image fusion problem. Finally, six steps are outlined to illustrate the substance of this patent application to correctly identify an object of interest from dynamic images.

Drawing attention again to FIG. 7, the goal is to detect when the signal S(t) may be in the high state. One means to accomplish this goal is to examine the orthogonal projection of the measured signal plus noise (S(t)+$\eta$(t)) with either another independent noise source or a reference signal (S(t)). If S(t) is low then the following scalar signals will have low absolute values:

$$\left| \int_0^T (S(\tau) + \eta_1(\tau))\eta_2(\tau) d\tau \right| \approx 0 \text{ or } \left| \int_0^T (S(\tau) + \eta_1(\tau))I_R(\tau) d\tau \right| \approx 0 \qquad \text{Eq 14}$$

where the noise sources $\eta_1(t)$ and $\eta_2(t)$ are assumed to be zero mean and independent.

If, however, S(t) is in the high state, the following scalar signal $\Delta(t)$ will have a higher absolute value:

$$\Delta(t) = \left| \int_0^T (S(\tau) + \eta_1(\tau))I_R(\tau) d\tau \right| > 0 \qquad \text{Eq 15}$$

Thus from the detection of a high level of $\Delta(t)$, the quantity in Eq 15 would be an indication of the signal S(t) being in a high state. These results hold for scalar quantities. The preferred arrangement of the present invention generalizes the concept to matrix quantities involving difference matrices. If a difference matrix adds no new information, it acts like a noise source (using the inner product operator on matrices). If, however, a difference matrix adds new information, then it provides value to the fusing of images in the dynamic image registration problem since it contains a signal of nonzero intensity.

The concepts discussed in Eq 14 and 15 will be applied to the image fusion-registration problem. The following six step procedure will be implemented as illustrated in FIG. 5.

Step 1: Measure a sample image $I_{Ti}(t)$.

Step 2: Develop a difference matrix $\text{Diff}_i(t)=I_{Ti}(t)-I_{Ri}(t)$. The time varying reference image $I_{Ri}(t)$ may be determined via Eqs 11-13 via $I_{Ri}(t)=T[\theta_i(t)] I_R$.

Step 3: To determine if the difference matrix $\text{Diff}_i(t)$ is noise or is signal plus noise, compute the inner product: $\Delta(t)<\text{Diff}_i(t),I_R(t)>$ from Eq 15.

Step 4: If $|\Delta(t)|>$threshold T, then select $I_{Ti}(t)$ as containing a new signal. Otherwise if $|\Delta(t)|$ is less than threshold T, then choose $I_{Ti}$ as noise and contains no new information.

Step 5: If $I_{Ti}$ is selected as noise, then discard the data and collect a new sample image. If, however, if $I_{Ti}$ is selected as a signal, then fuse the new image.

Step 6: If $I_{Ti}$ was selected as a signal in the previous step, move on and take another image sample. The image samples may be from different camera sources at the same time instant or from the same camera sources at a different point in time.

To show the efficacy of the preferred arrangement of the invention, computer simulations were run. Since this patent application is concerned with images and difference matrices which are represented by arrays of numbers, as a test case, the following situation is chosen. Let the matrix Y be the case of signal +noise (S+N) or the case of noise alone (N). This can be emulated in the following equation:

$$Y=A+(\text{factor})*\text{Identity Matrix} \qquad \text{Eq 16}$$

where A is chosen arbitrarily as a 7×7 matrix made up of random numbers from a Normal distribution (zero mean Gaussian). The Identity Matrix has 1's on the diagonal and zero for all other elements. The term "factor" is a measure of the signal to noise ratio for this simulation. As factor increases, the signal to noise ratio increases. This is a matrix analog representation of FIG. 7 which involves the standard assumptions for a signal either being high or just containing noise alone. Equation 9 would be an example of the test signals. Note if factor=0, then this corresponds to the pure noise case.

$$Y = \begin{bmatrix} 0.13 & -1.5 & 0.4 & 0.1 & -.62 & -.01 & -.17 \\ -.42 & -.15 & -.01 & .33 & .94 & -.66 & 1.7 \\ .25 & .43 & .22 & -.45 & -.21 & .05 & -.31 \\ -.37 & .71 & -.44 & -.19 & .33 & .17 & -.55 \\ .48 & -.68 & .57 & -.45 & .32 & .79 & -.88 \\ -1.2 & .29 & -.98 & .27 & .39 & -.44 & .63 \\ .45 & -.35 & .67 & -.36 & -1.5 & .11 & .36 \end{bmatrix} + \qquad \text{Eq 17}$$

$$(\text{factor}) \begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{bmatrix}$$

Figure 10:
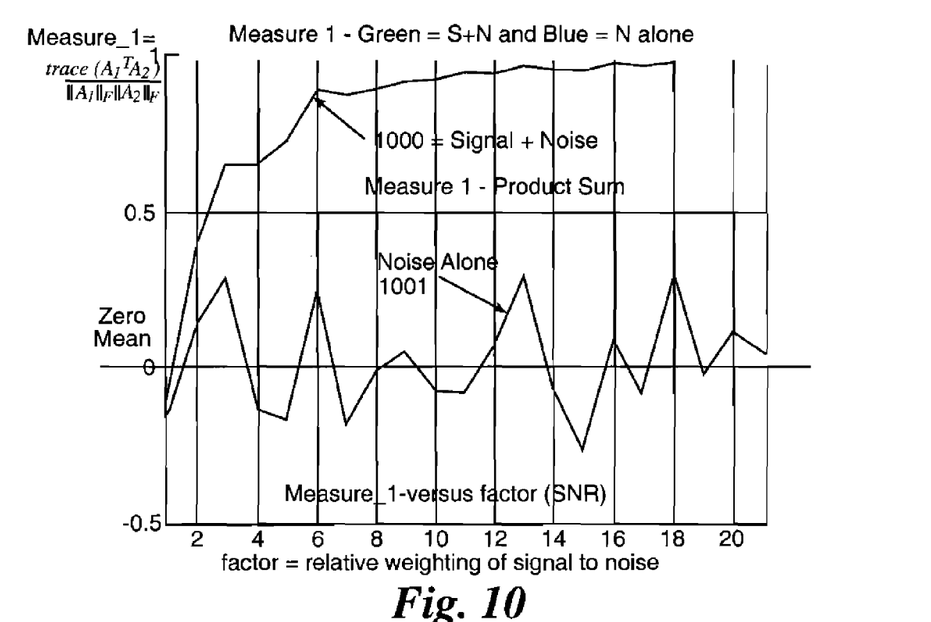
FIG. 10 is a graph illustrating signal to noise ratio according to an arrangement of the invention.
Figure 11:
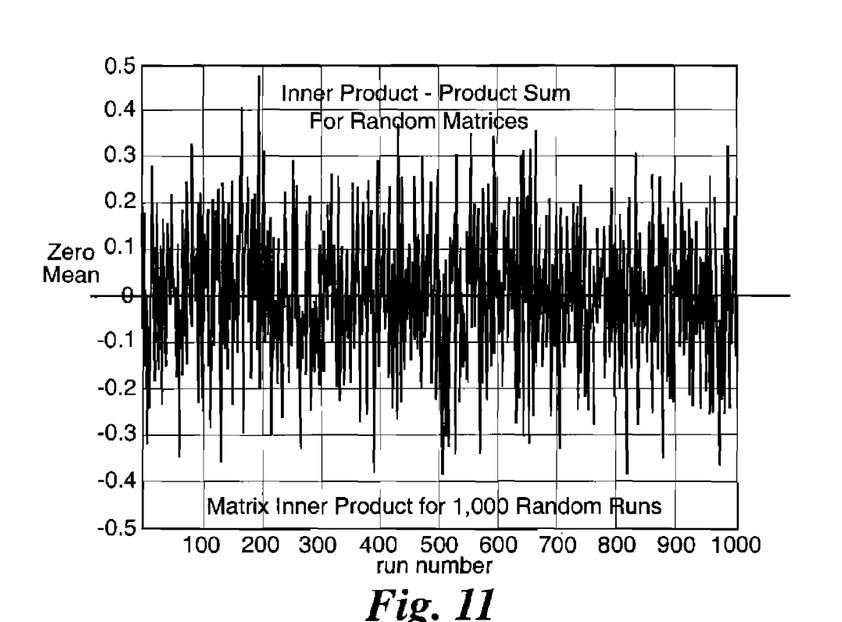
FIG. 11 is a graph illustrating matrix inner product for 1,000 random runs.
Figure 12:
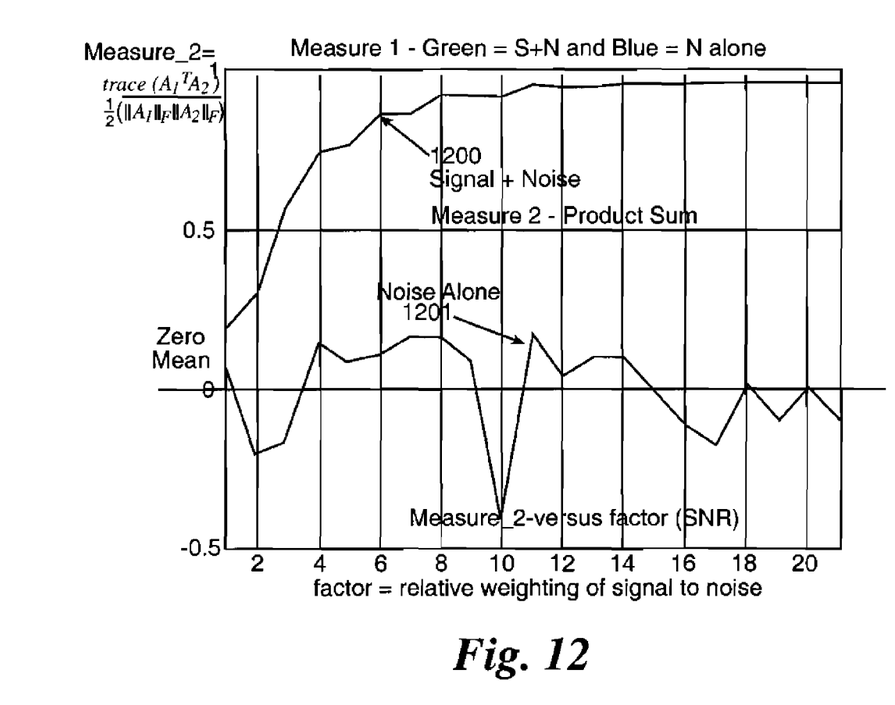
FIG. 12 is a graph illustrating signal to noise ratio according to an arrangement of the invention.

The first computer simulation will examine the efficacy of measure_1 to discern the signal from the noise. FIG. 10 illustrates measure versus factor signal to noise ratio. FIG. 10 displays the top 1000 plot (S+N) when the variable factor is varied from zero. If factor>0, then factor (x-axis variable in FIG. 10)) is the signal to noise ratio. The bottom curve 1001 corresponds to measure_1 for the noise alone case (factor=0). The goal is to distinguish the top curve 1000 from the bottom curve 1001 as the factor term increases. FIG. 11 illustrates the result of inner product operation on two random matrices for 1,000 runs. From FIG. 11, the simulation demonstrates that the inner product operator on random matrices will generate a random signal. Finally, FIG. 12 evaluates the efficacy of the measure_2 for the signal+noise and the noise alone case. FIG. 12 shows the signal plus noise at 1200 and the noise alone at 1201. Comparing measure_1 to measure_2 clearly demonstrates that both measures can discern the signal +noise case from the noise alone case, certainly if the factor (x-axis variable) greater than 3.

Figure 13:
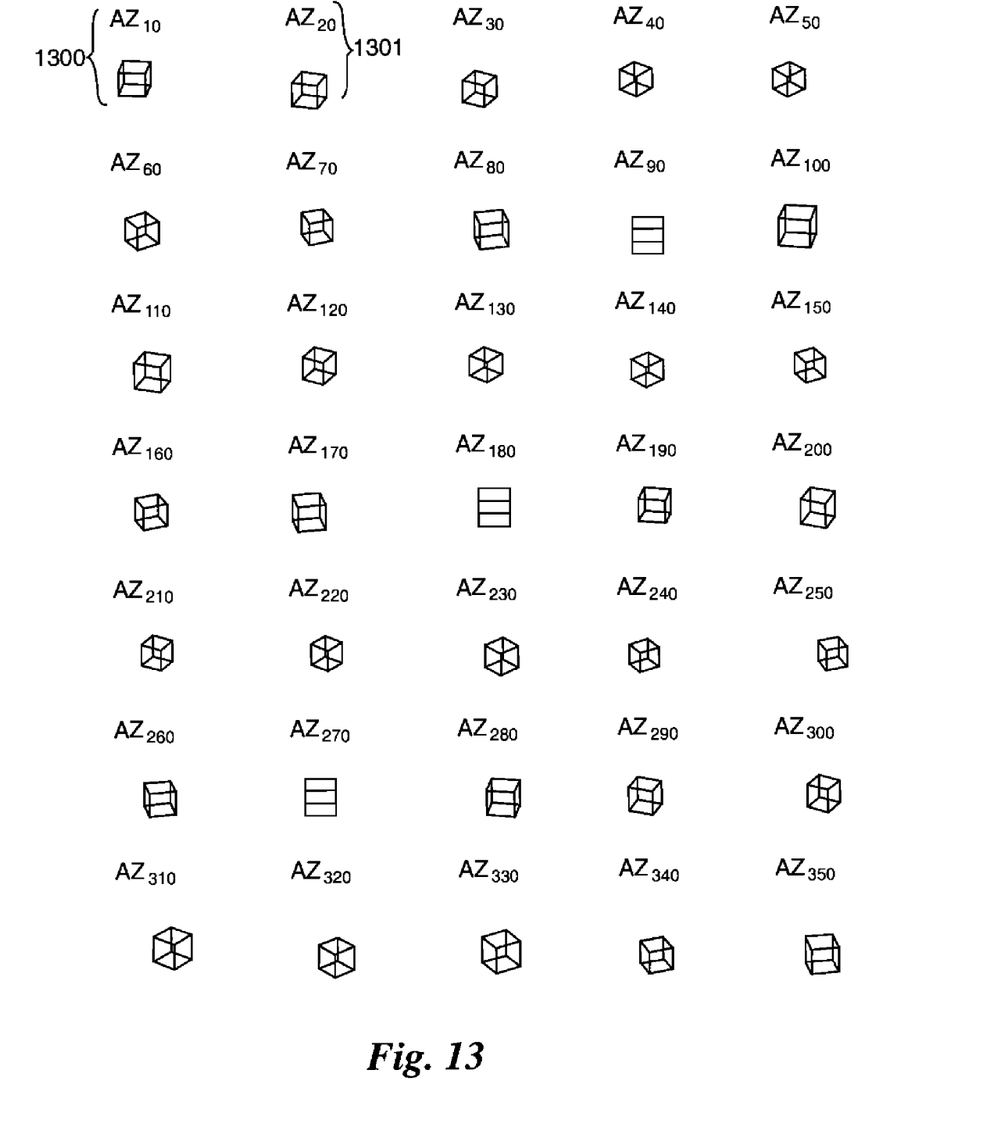
FIG. 13 shows test images to evaluate an algorithm.
Figure 14:
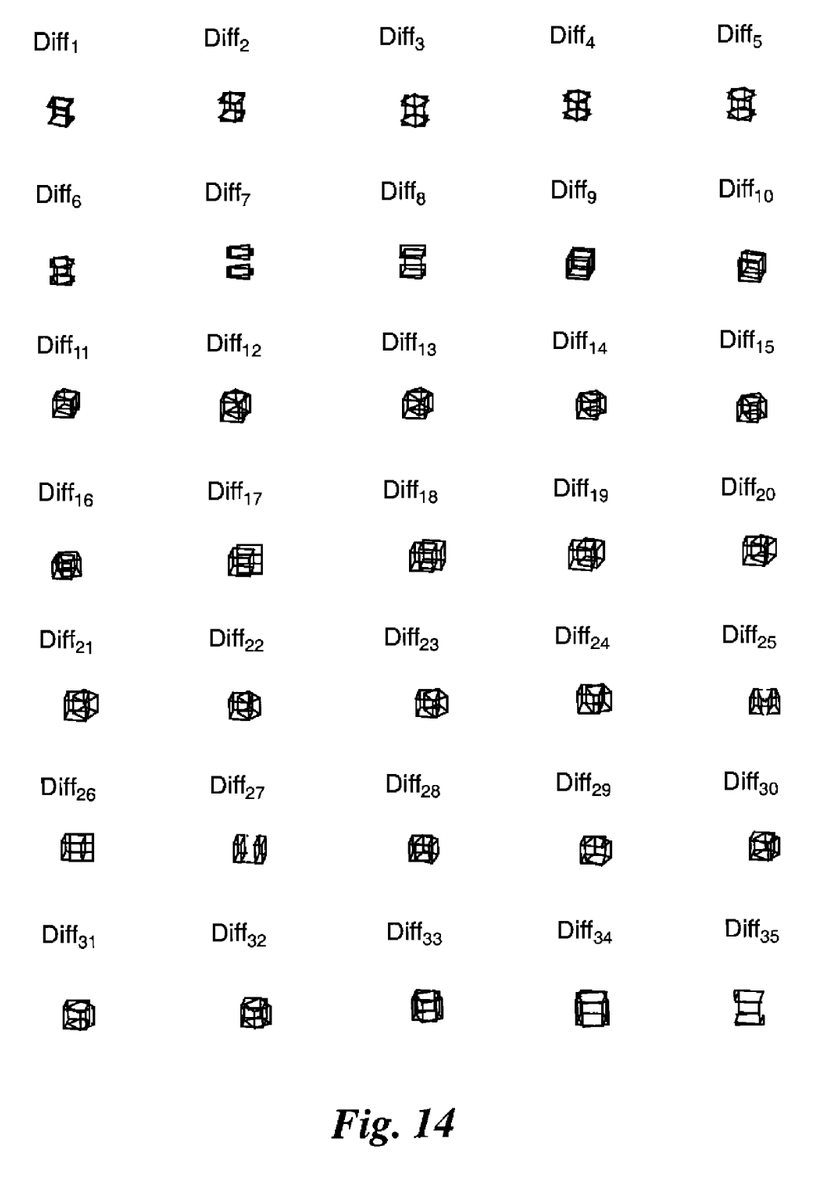
FIG. 14 shows difference images according to the arrangement of the invention.

FIG. 13 shows a set of sample images that were synthesized to study the efficacy of the algorithms of the preferred arrangement of the invention. By taking a unit cube, the baseline object was rotated in the azimuth direction every 10 degrees. Starting with Az=10 (a ten degree azimuth rotation from the original figure yields the object $AZ_{10}$ at 1300 in the top left hand corner of FIG. 13). The rotations continue at ten degree increments until Az=360 is reached. The difference matrices are then computed. The nomenclature for the difference matrices is:

$$\text{Diff}\_i = A_{10(i+1)} - A_{10} \qquad \text{Eq 18}$$

so that Diff_1 will correspond to the difference image between $A_{20}-A_{10}$ in FIG. 13 or the variation in the cube being rotated 10 degrees. This relates to a difference image between 1300 and 1301 in the top left hand corner of FIG. 13. In FIG. 14 the first 35 difference images are collected and displayed as a collage.

Figure 7:
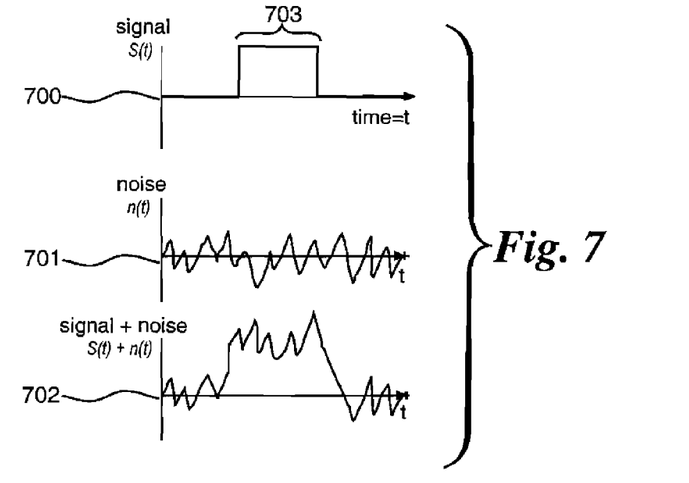
FIG. 7 shows graphs illustrating signal, noise, and signal plus noise in signal detection theory.

In order to evaluate the test set, refer back to the signal detection theory problem as posed in FIG. 7, the task is to measure $S(t)+\eta(t)$ in the bottom graph of FIG. 7 and to attempt to determine precisely when the signal S(t) may be in the high state. The inner product operator and the principles of orthogonal projection will be used to generalize the scalar signal detection theory example to the matrix case involving images. There are several analogies between the FIG. 7 (scalar) signal detection theory problem and the (matrix) problem involving images.

The noise $\eta(t)$ in FIG. 7 is analogous to the difference matrices $\text{Diff}_i$ in FIG. 14.

The signal $S(t)$ in FIG. 7) is analogous to the library cube objects in FIG. 13. When the signal is high, the cube is identified. When the signal is low, the cube is not present in the sample image. In both cases, only the signal +noise is allowed to be measured. The library object is the signal $S(t)$ and the following procedure will convert the image recognition problem into a signal detection theory problem. First for the case of FIG. 7, four steps will be employed to determine if the signal is in the high state.

Step 1: In FIG. 7, collect the signal $S(t)+\eta(t)$. This is the only signal that is available for measurement.

Step 2: The library object $S(t)$ in the top graph of FIG. 7 is presume known.

Step 3: Form the inner product operation of (t) with $S(t)+\eta(t)$.

Step 4: Use the following decision rule to determine when $S(t)$ may be in the high state.

If $<S(t)+\eta(t),S(t)>>T$, a threshold, then assume $S(t)$ is High. \hfill Eq 19

If, however, $<S(t)+\eta(t),S(t)>\leq T$, then assume $S(t)$ is Low. \hfill Eq 20

Note when $S(t)$ is in the low state (only noise appears in the measured signal), then $<\eta(t),S(t)>\approx 0$ is a small number \hfill Eq 21

However, when the signal is high $<S(t)+\eta(t),S(t)>\approx <S^2(t)>$ a larger number. \hfill Eq 22

Using the inner product operator, this technique is now generalized to the image recognition problem with the same four steps.

Step 1: Measure the target signal $I_{Ti}(t)$. This is analogous to collecting $S(t)+\eta(t)$.

Step 2: Using the library object $I_{Ri}$ (analogous to $S(t)$), compute the difference matrix $\text{Diff}_i$ where $\text{Diff}_i=I_{Ti}-I_{Ri}$ (this is also $S(t)+\eta(t)-S(t)$, cf. FIG. 5). Note that $\text{Diff}_i$ is analogous to the noise term $\eta(t)$.

Step 3: Form the matrix inner product operation of $I_{Ti}$ with the library object $I_{Ri}$ similar to Eqs 7-8.

Step 4: Use the similar decision rules such as in Eqs 19-22 with the image matrices as follows:

If $<I_{Ti}(t),I_{Ri}(t)>>T$, a threshold, then assume $I_{Ti}$ contains the similar object. \hfill Eq 23

If $<I_{Ti}(t),I_{Ri}(t)>\leq T$, a threshold, then assume $I_{Ti}$ does not contain the object. \hfill Eq 24

Again, similar to equation (21), if the difference image appears as noise, then $<\text{Diff}_i,I_{Ri}(t)>$ is a small number, and \hfill Eq 25 similar to Eq 22, it should follow that if:

$<I_{Ti}(t),I_R(t)>$ is a large number, \hfill Eq 26 then $I_{Ti}(t)$ contains the library object $I_{Ri}(t)$. This generalization is now tested using two variables called $\text{Factor}_1$ and $\text{Factor}_2$ to help make a binary decision about the similarity or difference of a sampled target image $I_{Ti}$ with respect to a possible library object $I_{Ri}$. These two factors are now introduced for the data displayed in FIGS. 13-14.

$$\text{Factor}_1 = \frac{<S(t)+\eta(t),S(t)>}{<S(t),S(t)>} = \quad \text{Eq 27}$$

$$\frac{<I_{Ti}(t),I_{Ri}(t)>}{<I_{Ri}(t),I_{Ri}(t)>} = \frac{<\text{Diff}_i+I_{Ri}(t),I_{Ri}(t)>}{<(I_{Ri}(t),I_{Ri}(t))>}$$

$$\text{Factor}_2 = \frac{<\eta(t),S(t)>}{<S(t),S(t)>} = \frac{<\text{Diff}_i,I_{Ri}(t)>}{<(I_{Ri}(t),I_{Ri}(t)>} \quad \text{Eq 28}$$

Thus from Eq 27 if the sampled target image $I_{Ti}$ contained the library object $I_{Ri}$, then $\text{Factor}_1$ should be high and close to 1.0. Similarly, from Eq 28, if the difference image was noise, then $\text{Factor}_2$ would be small, near zero. Thus the target image could be analyzed either by equation (27) with a target image $I_{Ti}$ or using Eq 28 with a difference image $\text{Diff}_i$.

Figure 15:
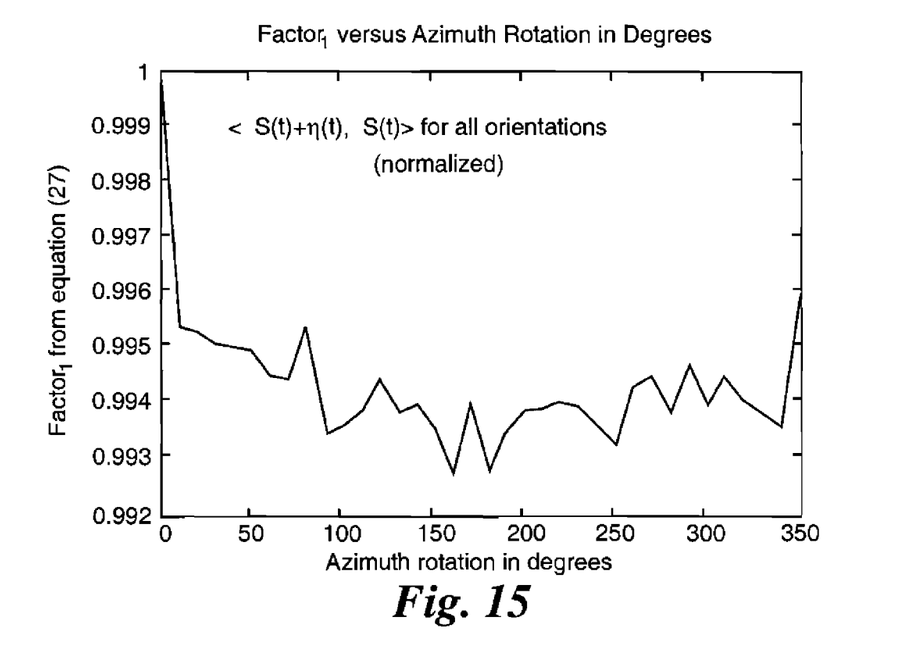
FIG. 15 shows azimuth rotation in degrees.
Figure 16:
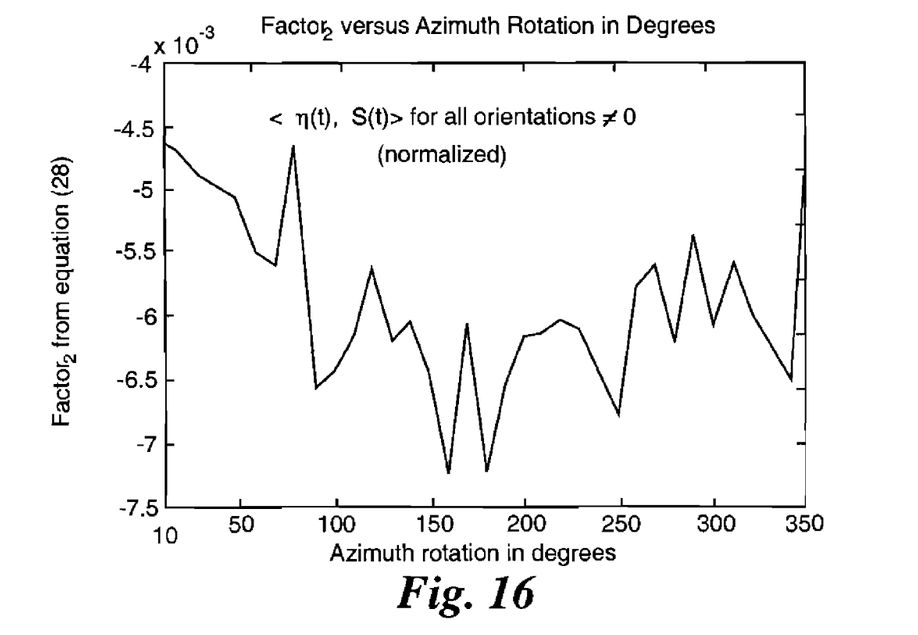
FIG. 16 shows rotations normalized.
Figure 17:
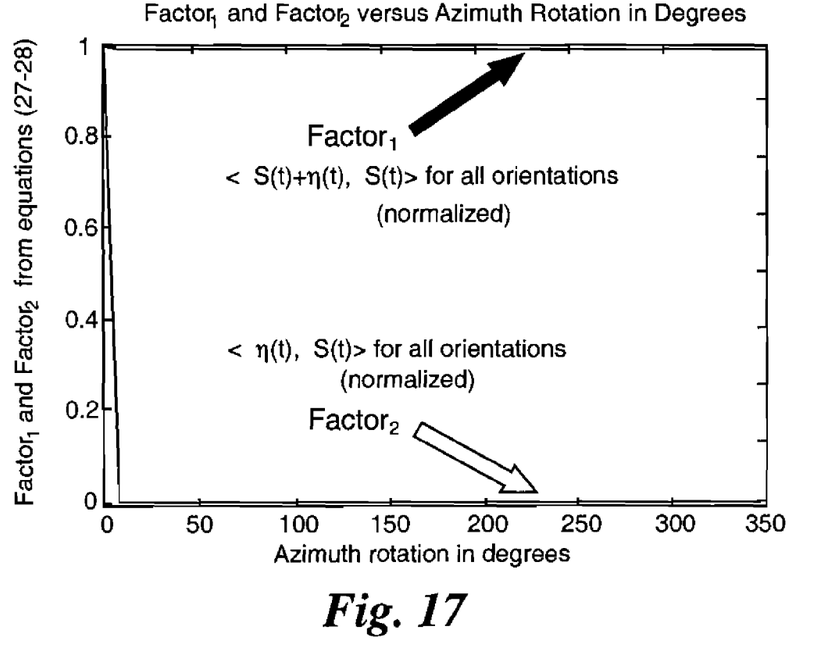
FIG. 17 shows azimuth rotation in degrees.

The final computer simulation will evaluate $\text{Factor}_1$ and $\text{Factor}_2$ of Eqs 27-28 for a similar object under rotation. FIG. 15 illustrates $\text{Factor}_1$ for the case of the cube being in 35 different azimuth positions. $\text{Factor}_1$ is calculated using Eq 27 and stays high and close to 1.0 for all orientations of the cube under consideration. The robustness of this plot to different azimuth angular rotations shows that the cube can be identified as a similar object in any arbitrary rotation. FIG. 16 now examines the difference images in FIG. 14 and evaluates $\text{Factor}_2$ for the various orientations. One would expect $\text{Factor}_2$ to be low (near zero) if the difference matrices are analogous to noise and contain little new information about the library object. In FIG. 16 this appears to be the case for all the orientations considered. Note in FIG. 16, the y axis is multiplied by a factor of $10^{-3}$. Finally, FIG. 17 combines the results of FIGS. 15-16 into one plot. The goal in FIG. 17 is to discern the case of the signal or noise and both $\text{Factor}_1$ and $\text{Factor}_2$ which seem to perform this task for any arbitrary rotation of the object cube.

Present image registration and fusion techniques lack the optimality procedures. The present invention provides optimality procedures for a dynamic scenario. Also, since the method employed herein involves an affine transformation matrix $T[\theta(t)]$, it is not necessary to store a large number of reference images $I_R(t)$. Rather, the dynamic reference images $I_{Ri}(t)$ can be calculated via $I_{Ri}(t)=T[\theta_i(t)] I_R$, which saves considerable computation time and computer storage in the implementation.

The foregoing description of the preferred embodiment has been presented for purposes of illustration and description. It is not intended to be exhaustive or to limit the invention to the precise form disclosed. Obvious modification or variations are possible in light of the above teachings. The embodiment was chosen and described to provide the best illustration of the principles of the invention and its practical application to thereby enable on of ordinary skill in the art to utilize the invention in various embodiments and with various modifications as are suited to the particular scope of the invention as determined by the appended claims when interpreted in accordance with the breadth to which they are fairly, legally and equitably entitled.

What is claimed is:

1. A method for registering and fusing time-varying image sources to provide highest possible information rendering to an operator, comprising the steps of:
   acquiring image data of an object of interest;
   first modeling rotation of said object of interest;
   second modeling time-changing dynamics of said object of interest using an affine transformation;
   mapping dynamics from said first and second modeling onto a difference image;

comparing reference images with said difference image to determine if there is information or noise comprising the steps of:
   determining a probability density function and a likelihood ratio;
   weighing the difference image using a decision-making algorithm;
fusing difference image found to be additional information with reference image to create a new said reference image;
repeating steps of acquiring, first and second modeling, mapping, comparing and fusing until said difference image is found to be noise after several cycles; and
providing last new said reference image to an operator as having a high information rendering.

2. The method of claim 1 for registering and fusing time-varying image sources to provide highest possible information rendering to an operator, wherein said mapping step further comprises:
   developing a difference matrix, $Diff(t)=I(t)-I(r)$, where $I(r)$ is a time-varying reference image; and
   computing an inner product, $\Delta(t)=<Diff_i(t), I_R(t)>$, for determining if said difference matrix is noise or signal and noise.

3. The method for registering and fusing time-varying image sources of claim 2, wherein said method of maximum likelihood decision theory comprises the step of modifying said time-varying image sources using an orthogonal projection technique charactering changing density functions.

4. The method of claim 1 for registering and fusing time-varying image sources to provide highest possible information rendering to an operator, further comprising the step, after said comparing step, of discarding difference image data of the an object of interest found to be noise.

5. The method of claim 1 for registering and fusing time-varying image sources to provide highest possible information rendering to an operator, wherein said weighing step further comprises computing an inner product, $\Delta(t)=<Diff_i(t), I_R(t)>$, for determining if said difference image is noise or signal and noise.

6. The method of claim 1 for registering and fusing time-varying image sources to provide highest possible information rendering to an operator, wherein said comparing step further comprises comparing references images $I_{Ri}(t)=T[\theta_i(t)] I_R$, whereby providing computation time and computer storage savings.

7. The method for registering and fusing time-varying image sources of claim 1, wherein said dynamic, time-varying optimality procedure from said selecting includes the method of maximum likelihood decision theory.

8. The method for registering and fusing time-varying image sources of claim 1, wherein said dynamic, time-varying optimality procedure from said selecting includes the method of maximum likelihood decision theory.

9. A method for registering and fusing time-varying image sources to provide highest possible information rendering to an operator, comprising the steps of:
   acquiring sample image data $I(t)$;
   developing a difference matrix, $Diff(t)=I(t)-I(r)$, where $I(r)$ is a time-varying reference image;
   computing an inner product, $\Delta(t)=<Diff_i(t), I_R(t)>$, for determining if said difference matrix is noise or signal and noise;
   selecting $I(t)$ as a new signal if $|\Delta(t)|>$ is greater than a preselected threshold T and selecting $I(t)$ as noise if $|\Delta(t)|$ is less than the preselected threshold T;
   discarding $I(t)$ selected as noise;
   fuse $I(t)$ selected as signal with $I(r)$ to create a new said $I(r)$;
   repeating steps beginning at acquiring step; repeating steps beginning at acquiring step for a preselected number of cycles when selecting $I(t)$ as an information providing signal; and
   providing the last said new $I(r)$ to an operator as having a high information rendering.

10. The method of claim 9 for registering and fusing time-varying image sources to provide highest possible information rendering to an operator, wherein said acquiring step further comprises acquiring sample image data $I(t)$ from the same camera sources at different points in time.

11. The method of claim 9 for registering and fusing time-varying image sources to provide highest possible information rendering to an operator, wherein said acquiring step further comprises acquiring sample image data $I(t)$ from different camera sources at the same time instant.

12. The method of claim 9 for registering and fusing time-varying image sources to provide highest possible information rendering to an operator, wherein said time-varying reference image from said developing step is calculated via $I_{Ri}(t)=T[\theta_i(t)] I_R$, whereby providing computation time and computer storage savings.

* * * * *